F. SCHNEIDER & G. B. CONRATH.
ENGINE.
APPLICATION FILED MAY 18, 1906.
899,625.
Patented Sept. 29, 1908.
7 SHEETS—SHEET 1.
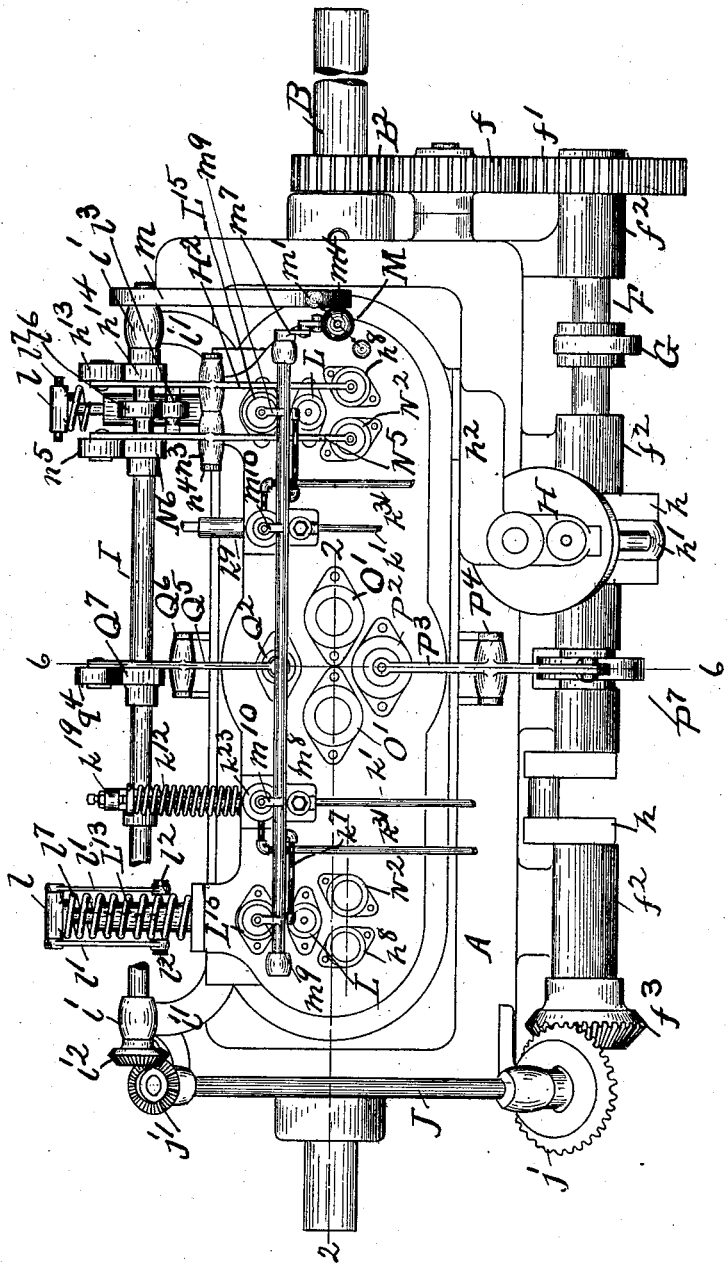
Witnesses
B. F. Parker
B. H. Phillips
Inventors
Fritz Schneider
and
George B. Conrath
by
Attorney

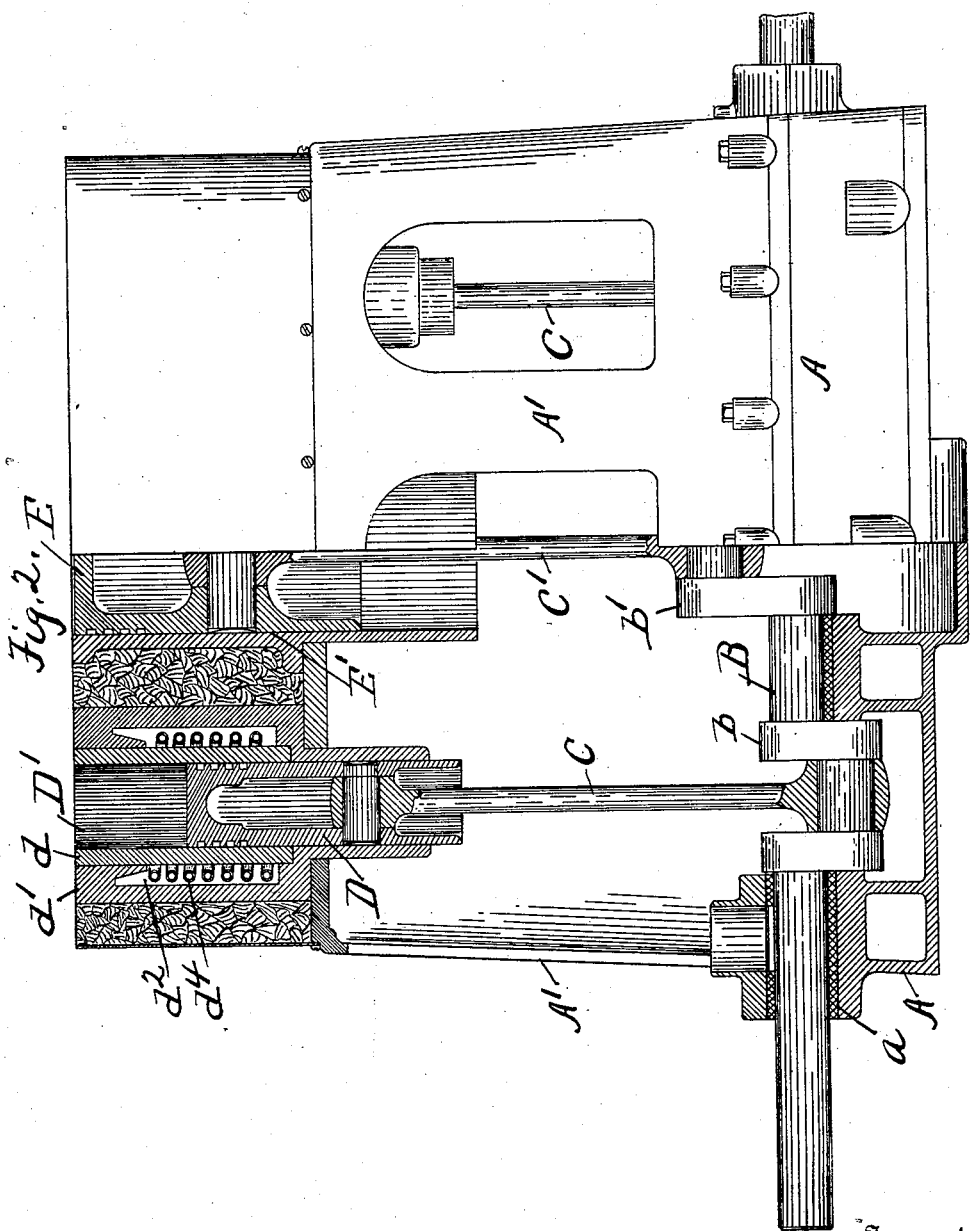

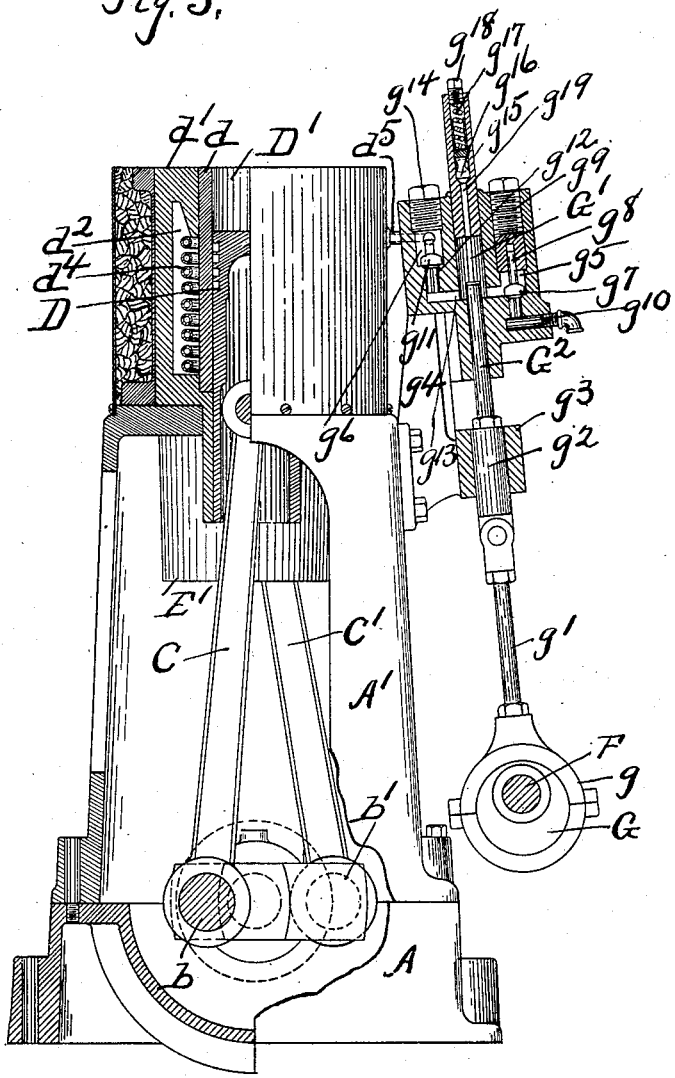

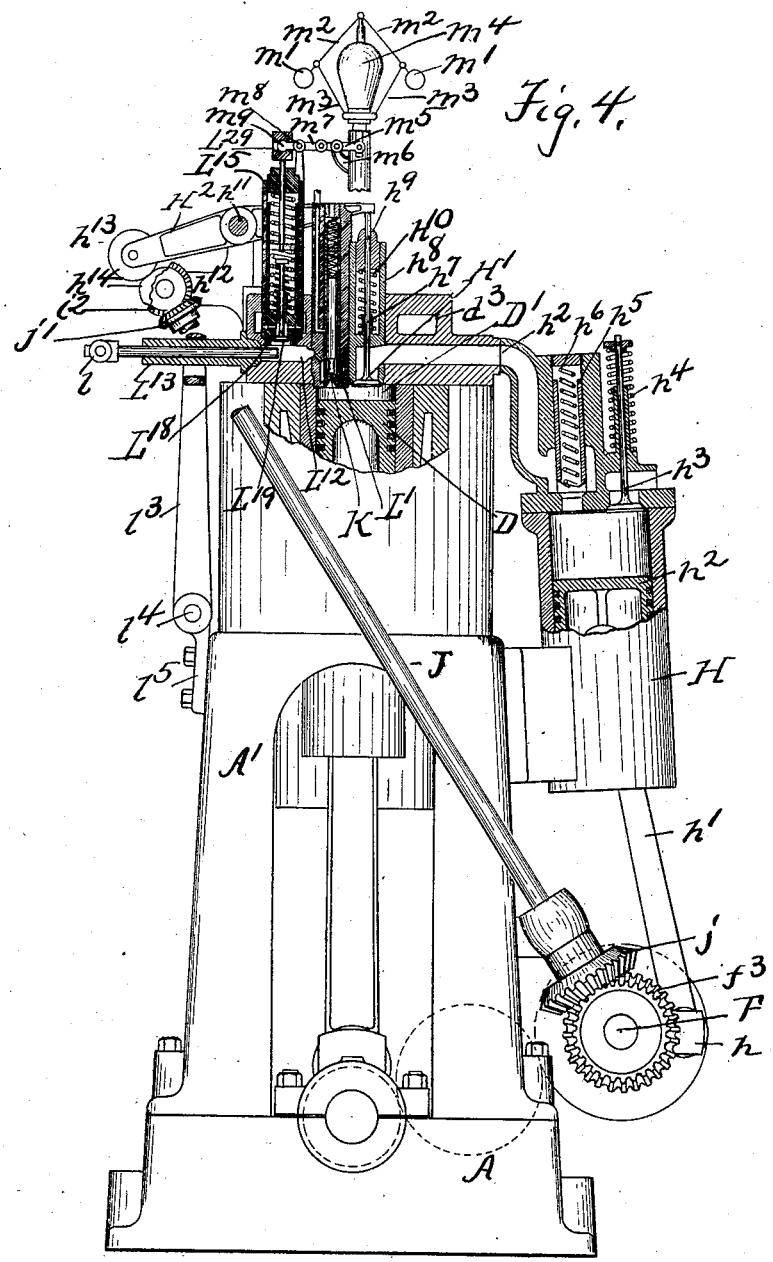

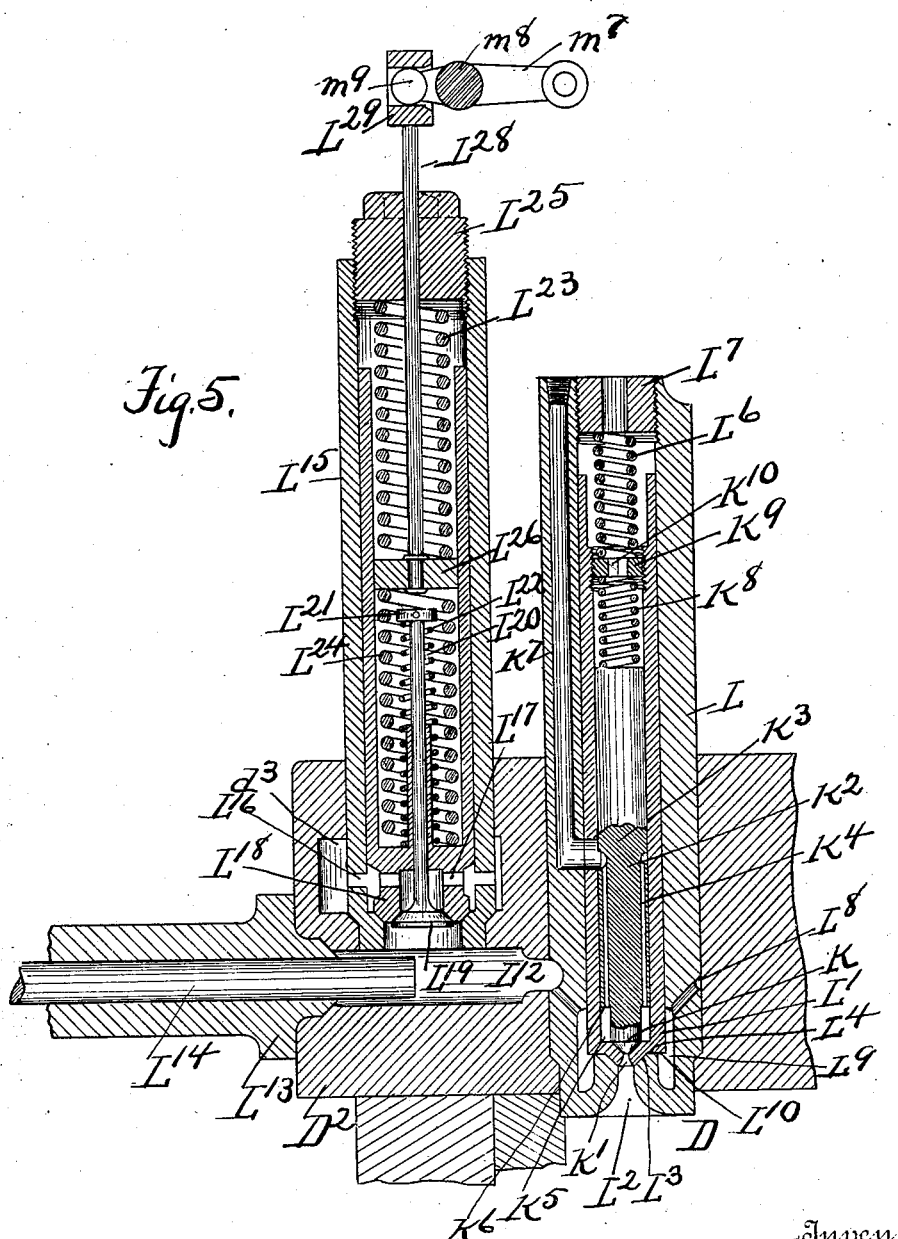

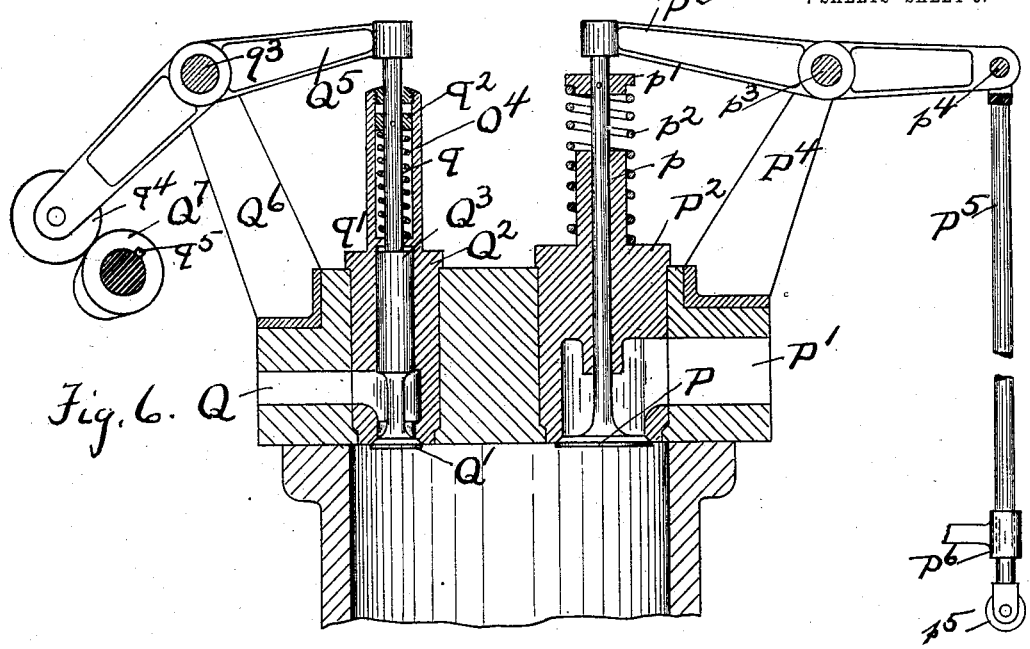
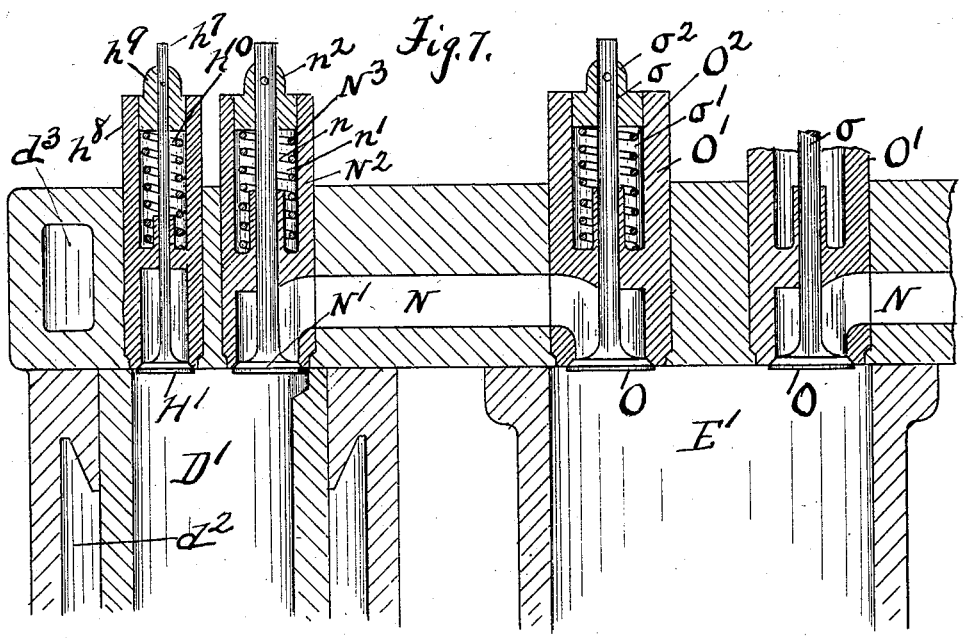

F. SCHNEIDER & G. B. CONRATH.
ENGINE.
APPLICATION FILED MAY 18, 1906.
899,625.
Patented Sept. 29, 1908.
7 SHEETS—SHEET 7.
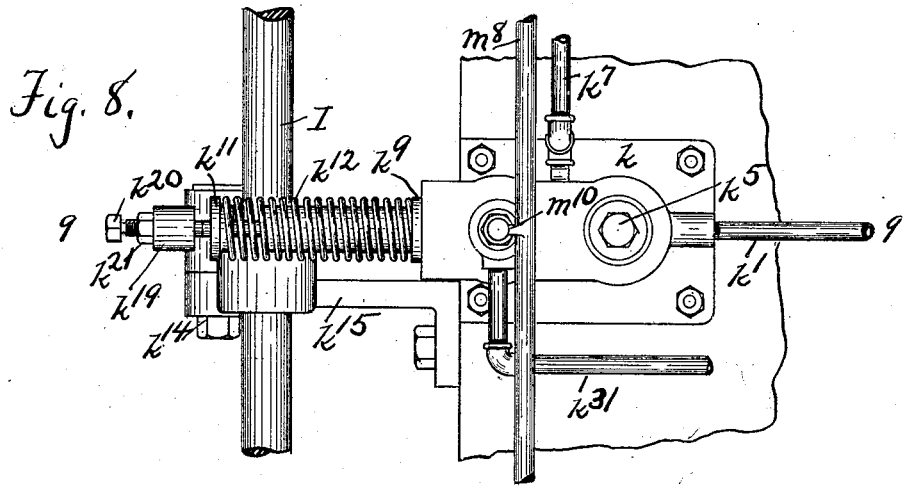
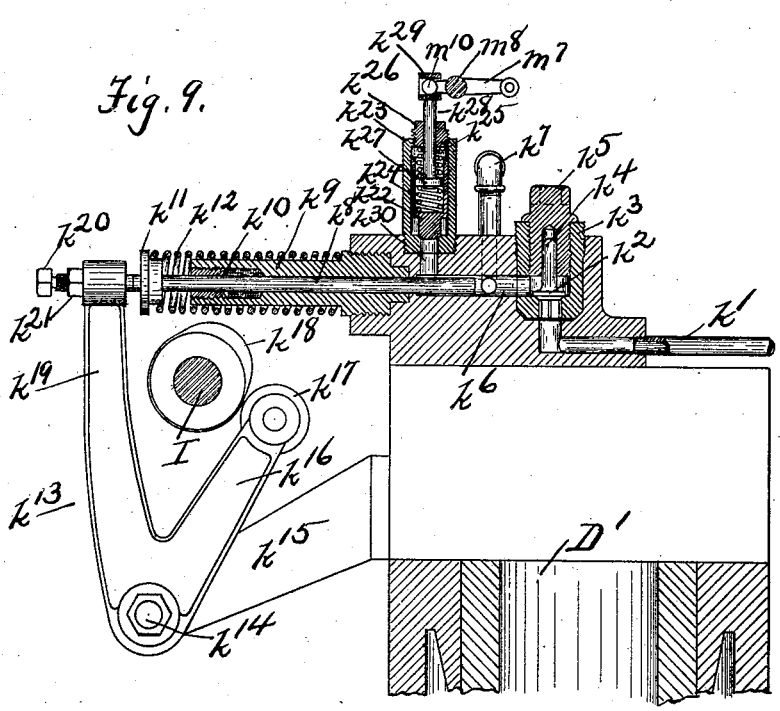
Witnesses
B. F. Parker
B. H. Phillips
Inventors
Fritz Schneider
and
George B. Conrath
by H. L. Lind
Attorney

UNITED STATES PATENT OFFICE.

FRITZ SCHNEIDER AND GEORGE B. CONRATH, OF ERIE, PENNSYLVANIA.

ENGINE.

No. 899,625.          Specification of Letters Patent.          Patented Sept. 29, 1908.

Application filed May 18, 1906. Serial No. 317,434.

*To all whom it may concern:*

Be it known that we, FRITZ SCHNEIDER and GEORGE B. CONRATH, citizens of the United States, residing at Erie, in the county of Erie and State of Pennsylvania, have invented new and useful Improvements in Engines, of which the following is a specification.

This invention relates to engines and consists in certain improvements in the construction thereof as will be hereinafter fully described and pointed out in the claims.

In the operation of the engine both steam and gas are utilized, the engine generating its own power. In the engine specifically shown, air is admitted to the generating cylinder and compressed sufficiently to raise its temperature to the igniting point. A combustible fuel, such as oil or gasolene is injected into this compressed air and ignites, burning as rapidly as fuel is supplied. After the ignition of the fuel and combustion is started, water is injected into the cylinder and the burning mixture immediately heats this water so as to convert it into steam. In fact, a heat may be obtained at such a degree as to chemically break up the water if desired, and the gases formed by this action utilized. Sufficient air is originally compressed to maintain combustion with the combustible fluid, injected preferably throughout the stroke of the piston in the generating cylinder and the water is also injected to the end of the stroke.

In the preferred construction of the engine, an expansion cylinder is provided into which the steam and gas is exhausted during the purging of the stroke of the generating cylinder. Still greater efficiency is acquired by providing two generating cylinders of the four cycle type with one expansion cylinder. The generating cylinders exhaust into the expansion cylinder alternately. We also prefer to provide this engine with a governing means for controlling the speed of the engine and in the construction shown this governing means operates both on the combustible fluid and the water supply for controlling the power.

Numerous details of the construction will appear from the specification and claims.

It is also preferred to provide the generating chamber with a water jacket in which is a coil for introducing the water in a reverse current through the coil and adapted to maintain comparatively uniform temperature of all parts of the cylinder and thus prevent distortion.

The invention is illustrated in the accompanying drawings as follows. Figure 1 shows a plan view of the engine. Fig. 2, a front elevation of the engine, partially in section on the line 2—2 in Fig. 1 the cylinder heads being removed. Fig. 3 shows an end elevation, partially in section through the generating cylinder and the water pump the cylinder heads being removed. Fig. 4, is a similar view, partially in section, the section showing the generating chamber valves and an air pump. Fig. 5, is an enlarged view of the inlet valve to the generating chamber and a part of the water pump. Fig. 6, is a section on the line 6—6 in Fig. 1. Fig. 7, an enlarged vertical section of the upper ends of the cylinders. Fig. 8, is a plan view of the combustible fluid pump. Fig. 9, a section on the line 9—9 in Fig. 8.

A marks the base of the engine. Arranged on this base is a frame A'. The base is provided with the boxes $a$ in which the crank shaft B is journaled. Pitmen C extend from the crank shaft to the piston D in the generating cylinders D' and the pitman C' extends from the crank to the piston E in the expansion cylinder E'.

The generating cylinders are provided with the cylinder shells $d$ around which is arranged the jacket $d'$. Arranged in this jacket is the water space $d^2$. This space surrounds the jacket and is connected with the water cooling cavity $d^3$ in the cylinder head. Arranged in the cavity $d^2$ is a coil $d^4$, the coil entering near the top of the space and discharging into the space near the bottom. The water from the cavity $d^2$ discharges into the cavity $d^3$ from which it is pumped into the engine as hereinafter described. Water enters the coil $d^4$ from the pump through the pipe $d^5$. This is arranged so that the water enters in the upper end of the coil $d^4$. It is manifest that the water as it passes up from the bottom of the cavity $d^2$ absorbs heat from the cylinder so that if it were not for the counteracting effect of the coil, the water would be much hotter at the upper end of the cavity than at the lower end and in consequence, there would be an unequal expansion of the cylinder shell and the distortion incident thereto.

Any desirable pump may be used in forcing the water through the pipe $d^5$. I prefer however, the pump shown. Arranged on the frame of the engine and parallel to the crank shaft is a main operating shaft F. This shaft is driven from the crank shaft by means of the gears $d^2$ on the crank shaft, the intermediate gear $f$ and the gear $f'$ on the shaft F. An eccentric G is arranged on the shaft F and an eccentric strap is arranged on this eccentric. The strap is connected by the eccentric rod $g'$ with the slide $g^2$. The slide is mounted in the guide $g^3$ and this guide is supported by a bracket $g^4$ secured to the frame of the engine. A piston $G^2$ is carried by the slide $g^2$ and extending through, and into a cylinder $G'$. The cylinder is supported by the bracket $g^4$. The inlet valve cavity $g^5$ comprises the valve proper $g^7$. This is of the ordinary check valve type having the stem $g^8$ extending into the plug $g^9$, the plug $g^9$ closing the cavity. Water enters through the pipe $g^{10}$ on the suction stroke of the piston. The water lifts the valve $g^5$ in the ordinary manner. The exhaust valve passage has the exhaust valve proper $g^{11}$. It has extending from it the spider $g^{12}$ which extends into the exhaust passage $g^{13}$, guiding the valve. The exhaust cavity is closed by the plug $g^{14}$. The cylinder is closed by a plug $g^{15}$. Arranged in this plug is a valve $g^{16}$. The valve is held to its seat by a spring $g^{17}$ tensioned between the valve and a plug $g^{18}$. The valve controls a passage $g^{19}$ and permits the waste of any excess of water which may be forced by the pump. The spring is ordinarily set to maintain the water in the water jacket at about 250 pounds. It is desirable, however, that the water should be sufficiently cool to save the lubricant on the cylinder walls.

We prefer to so compress the air in the generating chamber that the heat incident to the compression may raise the temperature of the air to the igniting point of the combustible fluid which is used with the engine. This might be accomplished by making a very long stroke. We prefer, however, to provide an auxiliary air pump so as to permit of the use of a shorter cylinder. In the preferred construction a pump is provided for each generating cylinder. These pumps are duplicates, and each driven from cranks $h$ on the shaft F. A pitman $h'$ connects the crank with the piston $h^2$ of the pump. The piston is arranged in the pump cylinder H. The pump cylinder is secured to the frame $A'$. The cylinder is provided with the inlet valve $h^3$. This valve is held normally to its seat by the spring $h^4$ and operates in the manner common to inlet valves. The discharge valve $h^5$ is held to its seat by means of the spring $h^6$ and it operates in the manner common to compressors or air pumps. A discharge passage $h^2$ extends to the generating cylinder. A valve $H'$ controls the connection between this passage and the cylinder. The valve is mounted in a plug $h^8$. The stem $h^7$ extends through this plug and has at its upper end a shoulder $h^9$. A spring $h^{10}$ is tensioned under this shoulder and tends to hold the valve in a closed position. The valve is operated by the lever $H^2$. The lever operating on the stem $h^7$ is pivoted at $h^{11}$ on a bracket $h^{12}$. The outer end of the lever is provided with a cam roller $h^{13}$ which is operated on by a cam $h^{14}$ mounted on the auxiliary operating shaft I. The auxiliary operating shaft I is journaled in the bearings $i$ carried by the bracket $i'$ extending from the cylinders. The shaft is driven from the main operating shaft by the transmission shaft J. A gear $j^3$ on the end of the main operating shaft meshes the gear $j$ on the transmission shaft J and a gear $j'$ on the transmission shaft meshes a gear $i^2$ on the shaft I. These gears with the transmission shaft communicate the movement of the main shaft to the auxiliary shaft.

The pump cylinder H is larger than the generating cylinder and the last half of the compression stroke of the piston $h^2$ takes place with the suction stroke of the piston in the generating cylinder. The air, therefore, at the end of the suction stroke of the generating piston D is thus increased above atmospheric pressure so that with the compression stroke of the piston in the generating cylinder, sufficient compression may be accomplished to acquire sufficient heat to cause ignition upon the introduction of the combustible fluid.

The combustible fluid is introduced into the compressed air and ignites immediately through the action of the air and thus increases the temperature. After the combustion is fairly started, water is introduced and the combustible fluid and water are preferably continuously introduced during the power stroke of the piston. Both the combustible fluid valve and water valve are contained in a valve plug L, and the combustible fluid valve is mounted within the water valve $L'$. The valve proper K has a plunger stem $K^2$ which makes a complete closure with the walls of the water valve $L'$. An annular groove $K^3$ is arranged around the plunger and the passages $K^4$ lead from this groove to a cavity $K^5$ formed between the walls of the valve $L'$ and the valve K. A passage $K'$ extends through the end of the water valve $L'$ into the passage $L^2$ in the end of the plug L. The passage $K^3$ extends through the walls of the valve $L'$ and communicates with a passage $K^7$ which leads to the combustible fluid pump. A nut $K^9$ is screwed into the walls of the valve $L'$ and a spring $K^8$ is tensioned between the stem $K^2$ and this nut, thus holding the valve K to its seat. The nut has the squared opening $K^{10}$ into which a wrench may be inserted for adjusting the nut and incidentally adjusting the spring $K^6$. A shoulder $K^6$ is formed at the upper end of the cavity $K^5$ and the valve K is unbalanced to this extent. When, therefore, this is subjected to the pressure incident to the action of the pump plunger, the valve is opened and liquid injected into the cylinder. The combustible fluid pump is shown in detail in Figs. 8 and 9. The pump is mounted in the block or casting $k$. This is connected by the pipe $k'$ with the combustible fluid supply. The inlet valve $k^2$ is arranged in the valve plug $k^3$. The valve has the stem $k^4$ which is carried by the plug $k^5$ so as to guide the valve. The valve is of the ordinary check valve type. The cylinder $k^6$ is arranged in the casting or block $k$. The cylinder is connected with the passage $K^7$ by means of the pipe $k^7$. The plunger $k^8$ extends into the cylinder and through a plug $k^9$ and gland $k^{10}$. This is provided with the shoulder $k^{11}$ against which is tensioned the spring $k^{12}$. The spring effects a return movement of the plunger. The plunger is actuated by a bell crank $k^{13}$. The bell crank lever is pivotally mounted at $k^{14}$ upon a bracket $k^{15}$, the bracket being secured to the head of the cylinder. The arm $k^{16}$ of the bell crank lever has the cam roller $k^{17}$, and this roller is actuated by the cam $k^{18}$ mounted on the shaft I. The arm $k^{19}$ has the adjusting screw $k^{20}$ which is arranged to act against the shoulder $k^{11}$. The screw is locked in adjustment by the nut $k^{21}$. An overflow valve $k^{22}$ is mounted in the valve plug $k^{23}$. The valve is held to its seat by the springs $k^{24}$ and $k^{25}$, tensioned between the valve and the plug $k^{26}$. The overflow passage $k^{30}$ is connected by a pipe $k^{31}$ with the combustible fluid supply.

The cam $k^{18}$ is so timed that just at the proper moment the plunger is forced forward and the pressure on the combustible fluid is so increased that, acting on the shoulder $K^6$, the valve K is lifted and the combustible flud injected into the cylinder. This ordinarily takes place just as the piston reaches the end of the compression stroke, or just prior to this moment.

After the combustion is started through the introduction of the combustible fluid, the water valve $L'$ is lifted and water is injected, the temperature being above the vaporizing point of water under pressure in the chamber, the water is immediately converted into steam. The heat may be so regulated as to chemically affect the water.

The end of the valve $L'$ extends into a cavity $L^9$ and the edges of the face $L^4$ of the valve extend over the face $L^3$ of the seat, forming an exposed shoulder $L^{10}$. To this extent the valve is unbalanced. The valve is subjected to the pressure of a spring $L^6$ which is tensioned between the nut $K^9$ and the plug $L^7$ at the top of the plug L. This spring may be adjusted by the plug $L^7$; so that any desired pressure may be made necessary to lift the valve. The cavity $L^9$ is in communication by means of radial passages with an annular passage $L^8$ and the annular passage $L^8$ is in communication with the cylinder $L^{12}$ of the water pump. The cylinder is closed by a plug $L^{13}$ and the pump plunger $L^{14}$ extends through this plug into the cylinder. The inlet valve $L^{19}$ is arranged in the inlet valve plug $L^{15}$. This plug extends into a water space $d^3$ and takes the water from the circulating system. The water passes through the passages $L^{16}$ in the sides of the plug $L^{15}$ and through passages $L^{17}$ in the waste valve $L^{18}$ by the valve $L^{19}$ into the cylinder. The valve $L^{19}$ has the stem $L^{20}$ on which is a shoulder $L^{21}$. The spring $L^{22}$ is tensioned against the shoulder $L^{21}$ and keeps the inlet valve $L^{19}$ normally closed.

The water pump actuating mechanism is shown in Figs. 1 and 4. The plunger ends in a crosshead $l$. Links $l'$ connect this cross head with the sides $l^2$ of a loop in a lever $l^3$. The lever $l^3$ is pivoted at $l^4$ on a bracket $l^5$. The bracket $l^5$ is secured to the frame as clearly shown in Fig. 4. The upper end of the lever $l^3$ is actuated by a cam $l^6$, (see at right of Fig. 1) the upper end of the lever being provided with a roller. This cam is so timed as to force the plunger $L^{14}$ inwardly and effect the introduction of water just after the combustion is started in the cylinder. The return movement of the plunger is effected through the action of the spring $l^7$ which is tensioned against the cross head $l$.

A mechanism is shown for governing the speed of the engine. The governor M may be of any desired type. This is driven by the belt $m$ and comprises the centrifugal weights $m'$ carried by the links $m^2$. The links $m^3$ connect the links $m^2$ with a weight $m^4$, the weight forming the centripetal element of the governor. The weight is connected with a lever $m^5$. This lever is pivoted on a bracket $m^6$ extending from the governor frame. The lever $m^5$ is pivotally connected to a lever $m^7$ and the lever $m^7$ is fixed on a shaft $m^8$. This mechanism rocks the shaft $m^8$ as the speed of the engine changes. Arranged between the springs $k^{24}$ and $k^{25}$ is a shoulder $k^{27}$. The stem $k^{28}$ extends upwardly from this shoulder and is provided with a slotted head $k^{29}$ at its upper end. A lever $m^{10}$ extends from the rod $m^8$ into the head $k^{29}$ and communicates the motion of the shaft $m^8$ to the shoulder $k^{27}$. With an upward movement of the shoulder $k^{27}$ the tension on the spring $k^{24}$ is decreased, consequently an overflow is more readily permitted past the overflow valve and in consequence a smaller amount of combustible fluid is injected into the cylinder, thus in this respect decreasing the power of the engine. We prefer also to control the power of the engine by controlling the introduction of the water. The valve $L^{18}$ controls the relief passage from the water pump. Arranged between the springs $L^{23}$ and $L^{24}$ is a shoulder $L^{26}$. A stem $L^{28}$ extends from this shoulder and is provided with a slot $L^{29}$ at its upper end. A lever $m^9$ extends into this head and communicates the action of the lever $m^8$ to the head $L^{29}$. With an upward movement of the shoulder $L^{26}$ the tension on the spring $L^{24}$ is decreased so that a ready escape of water is permitted and in consequence the amount of water injected into the cylinder is decreased.

The expansion cylinder E' is connected with the generating cylinder D' by means of a passage N. The valve N' controlling the discharge of the gases from the generating cylinder is mounted in a valve plug $N^2$. The stem $n$ of this valve extends through this plug into a cavity $n'$ in the plug. The stem has a shoulder $n^2$ and a spring $N^3$ and is tensioned against this shoulder and keeps the valve normally in a closed position. The valve is opened by a lever $N^5$. This lever is pivoted at $n^3$ on a bracket $n^4$ extending from the frame. A cam roller $n^5$ is mounted on the end of the lever $N^5$ and the lever is actuated by a cam $N^6$ which is properly timed to open the valve N' at the completion of the stroke of the generating cylinder. The passage N opens into the expansion cylinder past an inlet valve O. This valve is mounted in a plug O'. The stem $o$ of this valve extends through this plug into a cavity $o'$. The stem is provided with a shoulder $o^2$ against which the spring $O^2$ is tensioned for normally keeping the valve in a closed position.

There is a passage from each generating cylinder to the expansion cylinder and the valves controlling these passages and the mechanism for actuating the valves are similar, the only difference being that they are differently timed to act alternately. The expansion cylinder is provided with the exhaust passage P' which is controlled by the exhaust valve P. This valve is mounted in the plug $P^2$. The stem $p$ of the valve extends through the plug and is provided with the shoulder $p'$. A spring $p^2$ is tensioned against the shoulder and keeps the valve normally in a closed position. The valve is operated by the lever $P^3$. This lever is pivoted at $p^3$ on a bracket $P^4$ extending from the cylinder. A link $P^5$ is connected at $p^4$ with a lever $P^3$. This link extends through the guide $P^6$ and is provided at its end with a roller $p^5$. A cam $P^7$ on the main operating shaft F operates upon the roller and communicates movement to the valve P. This is properly timed to exhaust at each purging stroke of the piston E, the cam being a double cam.

In order to readily start the engine, we prefer to admit fluid under pressure to the expansion cylinder. This is done through a passage Q. This passage is controlled by the valve Q'. The valve is mounted in a plug $Q^2$. The valve stem has the enlarged plunger $Q^3$, about equal to the size of the valve so that the valve is practically balanced. This stem $q$ has the shoulder $q^2$. The stem passes through the shoulder $q'$ and a spring $Q^4$ is tensioned between the shoulders $q'$ and $q^2$, thus keeping the valve normally in a closed position. The valve is actuated by a lever $Q^5$. This lever is mounted at $q^3$ on a bracket $Q^6$ extending from the cylinder. This is provided with a cam roller $q^4$. A cam $Q^7$ is slidingly mounted on the auxiliary operating shaft I and is locked against rotation by spline $q^7$. In starting the engine, this cam is thrown into position to operate the lever $Q^5$.

We prefer to provide the jacket with an asbestos covering in order that the water may be more highly heated in the jacket, so that it may be injected at a higher temperature into the cylinder. With this in view, we have arranged the waste to the circulating pump so that the water may be regulated to the requirements of the engine and only so much forced into the jacket as is necessary.

What we claim as new is:

1. In an engine the combination of a generating chamber; power transmitting means actuated by the pressure generated in said chamber; devices for introducing combustible mixture into said chamber with certain strokes of the engine; mechanism timed in connection with said devices for injecting a liquid in quantities to vaporize under the influence of the burning mixture; and appliances acting on the liquid for automatically controlling the speed of the engine.

2. In an engine the combination of a generating chamber; power transmitting means actuated by the pressure generated in said chamber; devices for introducing combustible mixture into said chamber with certain strokes of the engine; mechanism timed in connection with said devices for injecting a liquid in quantities to vaporize under the influence of the burning mixture; and appliances acting on the mixture and liquid for automatically controlling the speed of the engine.

3. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said device for injecting a different fluid into the burning mixture formed by the air and combustible fluid; and appliances for automatically controlling the speed of the engine.

4. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said devices for injecting a different fluid into the burning mixture formed by the air and combustible fluid; and appliances acting on the combustible fluid for automatically controlling the speed of the engine.

5. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said devices for injecting a liquid into the burning mixture formed by the air and combustible fluid in quantities to be vaporized by the burning mixture; and appliances acting automatically for controlling the speed of the engine.

6. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said device for injecting a liquid into the burning mixture formed by the air and combustible fluid in quantities to be vaporized by the burning mixture; and appliances acting on the combustible fluid for automatically controlling the speed of the engine.

7. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said devices for injecting a liquid into the burning mixture formed by the air and combustible fluid in quantities to be vaporized by the burning mixture; and appliances acting on the liquid for automatically controlling the speed of the engine.

8. In an engine the combination of a generating chamber; means for compressing air therein with certain strokes of the engine to a pressure, which, with the heat incident to compression retained, will cause ignition of the combustible fluid; power transmitting means actuated by the pressure generated in the chamber; devices for injecting combustible fluid into the compressed air in said chamber; mechanism timed with relation to said devices for injecting a liquid into the burning mixture formed by the air and combustible fluid in quantities to be vaporized by the burning mixture; and appliances acting on the combustible fluid and the liquid for automatically controlling the speed of the engine.

9. In an engine the combination of a cylinder forming a generating chamber; a piston in the cylinder; means for admitting air with a suction stroke of the piston; apparatus for trapping the air in the cylinder on the compression stroke of the piston; devices for injecting a combustible fluid into the compressed air; mechanism timed with relation to said devices for injecting a different fluid into said cylinder while said combustible fluid is burning; and appliances for automatically controlling the speed of the engine.

10. In an engine the combination of a cylinder forming a generating chamber; a piston in the cylinder; means for admitting air with a suction stroke of the piston; apparatus for trapping the air in the cylinder on the compression stroke of the piston; devices for injecting a combustible fluid into the compressed air; mechanism timed with relation to said devices for injecting a liquid into said cylinder while said combustible fluid is burning in quantities to be vaporized by the burning fluid; and appliances for automatically controlling the speed of the engine.

11. In an engine the combination of a cylinder forming a generating chamber; a piston in the cylinder; means for admitting air with a suction stroke of the piston; apparatus for trapping the air in the cylinder on the compression stroke of the piston; devices for injecting a combustible fluid into the compressed air; mechanism timed with relation to said devices for injecting a different fluid into said cylinder while said combustible fluid is burning; and appliances acting on the combustible fluid for automatically controlling the speed of the engine.

12. In an engine the combination of a cylinder forming a generating chamber; a piston in the cylinder; means for admitting air with a suction stroke of the piston; apparatus for trapping the air in the cylinder on the compression stroke of the piston; devices for injecting a combustible fluid into the compressed air; mechanism timed with relation to said devices for injecting a different fluid into said cylinder while said combustible fluid is burning; and appliances acting on the combustible fluid and the liquid for automatically controlling the speed of the engine.

13. In an engine the combination of a generating cylinder; an expansion cylinder; pistons in said cylinders; devices for injecting combustible fluid into the generating cylinder during the power stroke of its pistons; mechanism for conveying the gases from the generating cylinder to the expansion cylinder whereby said gases may act expansively upon the piston of the expansion cylinder; and appliances for automatically controlling the speed of the engine.

14. In an engine the combination of two generating cylinders; devices controlling the introduction of fluids to said cylinders to operate therein in four cycles; the power stroke of one being in unison with the suction stroke of the other; an expansion cylinder, the power stroke of which is during the purging stroke of the generating cylinders alternately; apparatus for connecting the expansion cylinder with each generating cylinder during its purging stroke; and appliances for automatically controlling the speed of the engine.

15. In an engine the combination of two generating cylinders; devices controlling the introduction of fluids to said cylinders to operate therein in four cycles, the power stroke of one being in unison with the suction stroke of the other, said devices comprising means for injecting a combustible fluid into said generating cylinders during the power strokes of the same; an expansion cylinder, the power stroke of which is doing the purging stroke of the generating cylinders alternately; apparatus for connecting the expansion cylinder with each generating cylinder during its purging stroke; and appliances acting on said means for injecting combustible fluid for automatically controlling the speed of the engine.

16. In an engine the combination of a cylinder forming a generating chamber; a piston in the cylinder; means for admitting air with a suction stroke of the piston; and an air pump for forcing air into the cylinder with the suction stroke of the piston.

17. In an engine the combination of a cylder forming a generating chamber; a piston in the cylinder; means for admitting air with a suction stroke of the piston; an air pump for forcing air in to the cylinder during the suction stroke of the piston in sufficient quantities to make the compression by the piston in the compression stroke sufficient to raise the temperature of the air to the igniting point.

18. In an engine the combination of a generating chamber; devices for injecting two different fluids into the chamber; and valves arranged one within the other for controlling the introduction of said fluids.

19. In an engine the combination of a generating chamber; devices for injecting two different fluids into the chamber; valves arranged one within the other for controlling the introduction of said fluids; and an adjusting spring tensioning device in each of said valves.

20. In an engine the combination of a generating chamber; devices for injecting two different fluids into the chamber; and valves arranged one within the other for controlling the introduction of said fluids, said valves being arranged to open under the influence of the pressure of the fluid it controls.

21. In an engine the combination of a generating chamber; devices for injecting two different fluids into the chamber; valves arranged one within the other for controlling the introduction of said fluids, said valves being arranged to open under the influence of the pressure of the fluid it controls; and an adjustable spring tensioning device for each of said valves.

22. In an engine the combination of a generating chamber; devices for injecting a fluid into said chamber; and a valve controlling the introduction of said fluid, arranged to open under the influence of the pressure of the fluid it controls.

23. In an engine the combination of a generating chamber; devices for injecting fluids into the chamber; of valves $L'$ controlling the introduction of one fluid; and the valve $K$ controlling the introduction of another fluid, the valve $K$ being arranged within the valve $L'$ and controlling the passage $K'$ through the valve $L'$.

24. In an engine the combination of a generating chamber; devices for injecting different fluids into the chamber; the valve $L'$ controlling one of the fluids, the end of the valve having the exposed surface $L^{10}$ on which the fluid controlled acts to open the valve; and the valve $K$ arranged within the valve $L'$ having the exposed shoulder $K^6$ on which the fluid controlled acts to open the valve.

25. In an engine the combination of a generating chamber; devices for injecting two different fluids into the chamber; valves arranged one within the other for controlling the introduction of said fluid; the nut $K^9$ within the outer valve; a spring tensioned between said nut and the inner valve; and the spring $L^6$ tensioned against said nut for exerting pressure on the outer valve.

26. In an engine the combination of a generating chamber; two pumps for injecting two different fluids into the chamber, comprising plungers operating one after the other, and valves, one nested within the other, for controlling the passage of the fluids from the pumps to the chambers, said valves being arranged to open under the pressure of the fluid upon them.

27. In an engine the combination of a generating chamber; a pump for forcing fluid into said chamber; a valve controlling the introduction of said fluid, said valve being arranged to open under the influence of the pressure of the fluid upon it; and said pump being timed to act with the engine to exert pressure to open the valve with a certain cycle of the engine.

28. In an engine the combination of a generating chamber; power transmitting means actuated by the pressure generated in said chamber; a pump comprising a plunger timed to introduce combustible mixture into said chamber with certain strokes of the engine and continuing the same after ignition; and mechanism timed with relation to said pump for injecting a different motor fluid into the burning mixture in said chamber.

29. In an engine the combination of a generating chamber; power transmitting means actuated by the pressure generated in said chamber; a pump comprising a plunger timed to introduce combustible mixture into said chamber with certain strokes of the engine and continuing the same after ignition; and mechanism timed with said pump for injecting a liquid into the burning mixture in said chamber.

30. In an engine the combination of a generating chamber; means actuated by the pressure generated in said chamber; a pump comprising a plunger timed to inject a combustible fluid into said chamber and to continue the same during the power stroke of the engine; and mechanism timed with relation to said pump for injecting a different motor fluid into the burning mixture in said chamber, while combustible fluid is being injected by said pump.

31. In an engine the combination of a generating chamber; means for compressing air therein with certain strokes of the engine to a pressure, which, with the heat incident to compression retained, will cause ignition of a combustible fluid; power transmitting means actuated by the pressure generated in the chamber; a pump comprising a plunger for injecting a combustible fluid into the compressed air in said chamber during the power stroke of the engine; and mechanism timed with relation to said pump for injecting a different fluid into the burning mixture formed by the air and combustible fluid while combustible fluid is being injected by said pump.

32. In an engine the combination of a cylinder forming a generating chamber; a piston in the cylinder; means for admitting air with a suction stroke of the piston; apparatus for trapping the air in the cylinder on the compression stroke of the piston; a pump comprising a plunger timed to inject a combustible fluid into the compressed air during the power stroke of the engine; and mechanism timed with relation to said pump for injecting a different fluid into the burning mixture formed by the air and combustible fluid.

33. In an engine the combination of a generating chamber; means for compressing air therein with certain strokes of the engine to a pressure, which, with the heat incident to compression retained, will cause ignition of a combustible fluid; power transmitting means actuated by the pressure generated in the chamber; devices for injecting combustible fluid into the compressed air in said chamber; and a pump comprising a plunger timed to inject a different fluid into the burning mixture formed by the air and combustible fluid while combustible fluid is being injected.

34. In an engine the combination of a cylinder forming a generating chamber; a piston in the cylinder; means for admitting air with a suction stroke of the piston; apparatus for trapping the air in the cylinder on the compression stroke of the piston; devices for injecting a combustible fluid into the compressed air; and a pump comprising a plunger timed to inject different fluid into the cylinder while said combustible fluid is burning.

35. In an engine the combination of a generating chamber; means actuated by the pressure generated in said chamber for actuating the engine; a pump timed to inject a fluid into the chamber during a power stroke; and a pump comprising a plunger timed to inject a different motor fluid into the chamber while said combustible fluid is burning.

36. In an engine the combination of a generating chamber; power transmitting means actuated by the pressure generated in said chamber; a pump timed to inject a fluid into the chamber during a power stroke; and a pump comprising a plunger timed to inject a different fluid into the chamber after the ignition of the combustible fluid in said chamber.

37. In an engine the combination of a generating chamber; means for compressing air therein with certain strokes of the engine to a pressure, which, with the heat incident to compression retained, will cause ignition of a combustible fluid; power transmitting means actuated by the pressure generated in the chamber for actuating the engine; a pump comprising a plunger timed to inject a combustible fluid into the compressed air in said chamber during the power stroke of the engine; and a pump comprising a plunger timed to inject a different fluid into the burning mixture formed by the air and combustible fluid.

38. In an engine the combination of a generating chamber; means for compressing air therein with certain strokes of the engine to a pressure, which, with the heat incident to compression retained, will cause ignition of a combustible fluid; power transmitting means actuated by the pressure generated in the chamber for actuating the engine; a pump comprising a plunger timed to inject a combustible fluid into the compressed air in said chamber during the power stroke of the engine; and a pump comprising a plunger timed to inject a different fluid into the burning mixture formed by the air and combustible fluid, said pumps being timed relatively to each other to inject the combustible fluid first and the different fluid after ignition of the combustible fluid and for continuing the injection of said fluids with the power stroke of the engine.

39. In an engine the combination of a cylinder forming a generating chamber; a piston in the cylinder; means for admitting air with a suction stroke of the piston; apparatus for trapping the air in the cylinder on the compression stroke of the piston; a pump comprising a plunger for injecting a combustible fluid into the compressed air with the power stroke of the engine; and a pump comprising a plunger timed to inject a different fluid into said chamber while the combustible fluid is burning.

40. In an engine the combination of a cylinder forming a generating chamber; a piston in the cylinder; means for admitting air with a suction stroke of the piston; apparatus for trapping the air in the cylinder on the compression stroke of the piston; a pump comprising a plunger for injecting a combustible fluid into the compressed air with the power stroke of the engine; and a pump comprising a plunger timed to inject a different fluid into said chamber while the combustible fluid is burning, said pump being timed relatively to each other to first inject the combustible fluid and after the ignition of the same, the different fluid, and to continue the injection of said fluids with the power stroke of the engine.

41. In an engine the combination of a generating chamber; power transmitting means actuated by the pressure generated in said chamber; a pump for injecting a combustible fluid into said chamber; a waste for said pump; and means for adjusting the waste to control the combustible fluid introduced.

42. In an engine the combination of a generating chamber; power transmitting means actuated by the pressure generated in said chamber; a pump for injecting a combustible fluid into said chamber; a waste for said pump; and appliances for adjusting the waste to automatically control the speed of the engine.

43. In an engine the combination of a generating chamber; power transmitting means actuated by the pressure generated in said chamber; a pump for forcing combustible fluid into said chamber; a waste in said pump; a valve controlling said waste; a spring pressure device arranged in said valve comprising two springs; a device arranged between said springs; and appliances operating upon said devices for varying the tension of the springs and with it the waste for controlling the combustible fluid introduced to the engine.

44. In an engine the combination of a generating chamber; power transmitting means actuated by the pressure generated in said chamber; a pump for forcing combustible fluid into said chamber; a waste in said pump for forcing combustible fluid into said chamber; a waste in said pump; a valve controlling said waste; a spring pressure device arranged on said valve comprising two springs; the shoulder $L^{26}$ between the springs, the stem extending from said shoulder; a governor operating upon said stem for varying the speed of the engine.

45. In an engine the combination of a generating chamber; power transmitting means actuated by the pressure generated in said chamber; a pump for forcing combustible fluid into said chamber; a valve controlling the movement of the fluid from pump to chamber, said valve being arranged to be opened under the influence of the pressure of the fluid upon it; a waste for the pump; and means for adjusting the waste to vary the quantity of fluid introduced to the engine.

46. In an engine the combination of a generating chamber; power transmitting means actuated by the pressure generated in said chamber; a pump for forcing combustible fluid into said chamber; a valve controlling the movement of the fluid from pump to chamber, said valve being arranged to be opened under the influence of the pressure of the fluid upon it; a waste for the pump; and appliances for automatically adjusting the waste to vary the amount of combustible fluid introduced to the engine to automatically vary the speed of the engine.

47. In an engine the combination of a generating chamber; power transmitting means actuated by the pressure generated in said chamber; a pump for forcing combustible fluid into said chamber; a waste for said pump; means for adjusting the waste to vary the amount of combustible fluid introduced; and mechanism for injecting a different motor fluid into said chamber while the combustible fluid is burning.

48. In an engine the combination of a generating chamber; power transmitting means actuated by the pressure generated in said chamber; a pump for forcing combustible fluid into said chamber; a valve controlling the movement of the fluid from pump to chamber, said valve being arranged to be opened under the influence of the pressure of the fluid upon it; a waste for the pump; and mechanism for injecting a different motor fluid into the chamber while the combustible fluid is burning.

49. In an engine the combination of a generating chamber; power transmitting means actuated by the pressure generated in said chamber; a pump for injecting a combustible fluid into the chamber; a waste for the pump; means for adjusting the waste to vary the amount of fluid introduced; a valve interposed between the pump and chamber, said valve being adapted to be operated by the pressure of the fluid from the pump upon it; and an adjustable means for exerting opposing pressure on the valve.

50. In an engine the combination of a generating chamber; power transmitting means actuated by the pressure generated in said chamber; a pump for injecting a combustible fluid into the chamber; a waste for the pump; means for adjusting the waste to vary the amount of fluid introduced; a valve interposed between the pump and chamber, said valve being adapted to be operated by the pressure of the fluid from the pump upon it; an adjustable means for exerting opposing pressure on the valve; and mechanism for injecting a different motor fluid into the chamber while the combustible fluid is burning.

51. In an engine the combination of a generating chamber; power transmitting means actuated by the pressure generated in said chamber; a pump for injecting a combustible fluid into the chamber; a waste for the pump; appliances for automatically adjusting the waste to vary the amount of combustible fluid introduced to the chamber to automatically vary the speed of the engine; a valve interposed between the pump and chamber, said valve being adapted to be operated by the pressure of the fluid from the pump upon it; and an adjustable means for exerting opposing pressure on the valve.

52. In an engine the combination of a generating chamber; power transmitting means actuated by the pressure generated in said chamber; devices for introducing combustible mixture into the said chamber with certain strokes of the engine; a pump for injecting a different motor fluid into the burning mixture; a waste for said pump; a valve interposed between the pump and chamber, said valve being arranged to be actuated by the pressure of the fluid upon it; and means for adjusting said valve.

53. In an engine the combination of a generating chamber; power transmitting means actuated by the pressure generated in said chamber; devices for introducing combustible mixture into the said chamber with certain strokes of the engine; a pump for injecting a different motor fluid into the burning mixture; and an adjustable waste for said pump.

54. In an engine the combination of a generating chamber; power transmitting means actuated by the pressure generated in said chamber; devices for introducing combustible mixture into the said chamber with certain strokes of the engine; a pump for injecting a different motor fluid into the burning mixture; an adjustable waste for said pump; a valve interposed between the pump and the chamber, said valve being arranged to be actuated by the pressure of the fluid upon it; and an adjustable means for exerting opposing pressure on said valve.

55. In an engine the combination of a generating chamber; power transmitting means actuated by the pressure generated in said chamber; devices for introducing combustible mixture into said chamber with certain strokes of the engine; a pump for injecting a different motor fluid into the burning mixture; a waste for said pump for varying the amount of motor fluid injected; and appliances for automatically adjusting the waste for automatically controlling the speed of the engine.

56. In an engine the combination of a generating chamber; power transmitting means actuated by the pressure generated in said chamber; devices for introducing combustible mixture into said chamber with certain strokes of the engine; a pump for injecting a different motor fluid into the burning mixture; a waste for said pump; a valve controlling said waste; a spring exerting pressure on said valve; and appliances for automatically varying the force of the said spring to control the speed of the engine.

57. In an engine the combination of a generating chamber; power transmitting means actuated by the pressure generated in said chamber; devices for introducing combustible mixture into said chamber with certain strokes of the engine; a pump for injecting a different fluid into the burning mixture; a waste for said pump; the valve $L^{18}$ controlling said waste; a spring compressing on said valve; means for adjusting said spring; the inlet valve $L^{19}$ arranged in the valve $L^{18}$; and a spring for normally closing said valves.

58. In an engine the combination of a generating chamber; power transmitting means actuated by the pressure generated in said chamber; devices for introducing combustible mixture into said chamber with certain strokes of the engine; a pump for injecting a different motor fluid into the burning mixture in said chamber and a waste for said pump; the valve $L^{18}$ controlling said waste; the inlet valve arranged on the waste valve; the double springs $L^{23}$ and $L^{24}$; the shoulder $L^{26}$ between the said springs; and a governor acting on said shoulder for varying the pressure of the spring on the valve $L^{18}$.

59. In an engine the combination of a generating chamber; power transmitting means actuated by the pressure generated in said chamber; a pump for injecting a combustible fluid into said chamber; a waste for said pump; means for adjusting said waste to vary the combustible fluid injected; a second pump for injecting a different motor fluid into the burning combustible fluid; a waste in said second pump; and means for adjusting the waste to vary the fluid injected by the second pump.

60. In an engine the combination of a generating chamber; power transmitting means actuated by the pressure generated in said chamber; a pump for injecting a combustible fluid into said chamber; a waste for said pump; means for adjusting said waste to vary the combustible fluid injected; a second pump for injecting a different motor fluid into the burning combustible fluid; a waste for said second pump; means for adjusting the waste to vary the fluid injected by the second pump; valves interposed between said pumps and the chambers, said valves being arranged to open under the influence of the pressure of the fluid pumped; and an adjustable means for exerting opposing pressure upon said valves.

61. In an engine the combination of a generating cylinder; an expansion cylinder; pistons in said cylinders; devices for injecting combustible fluid into the combustion chamber; a passage connecting said cylinders; a valve controlling the discharge of the gases from the generating chamber to said passage; and means for actuating said valve to open the same at the end of the power stroke of the piston in the generating cylinder.

62. In an engine the combination of a generating cylinder; an expansion cylinder; pistons in said cylinders; devices for injecting combustible fluid into the combustion chamber during the power stroke of its piston; a passage connecting said cylinders; a valve controlling the discharge of gases from the generating chamber to said passage; and means for actuating said valve to open the same at the end of the power stroke of the piston in the generating cylinder.

63. In an engine the combination of a generating cylinder; an expansion cylinder; pistons in said cylinders; devices for injecting combustible fluid into the combustion chamber; a passage connecting said cylinders; a valve controlling the discharge of gases from the generating chamber to said passage; means for actuating said valve to open the same at the end of the power stroke of the piston in the generating cylinder; and a valve controlling the entrance of said passage to the expansion cylinder, said valve being arranged to prevent a back flow of gases from the expansion cylinder to said passage.

64. In an engine the combination of a generating cylinder; an expansion cylinder; pistons in said cylinders; devices for injecting combustible fluid into the combustion chamber; a passage connecting said cylinders; a valve controlling the discharge of gases from the generating chamber to said passage; means for actuating said valve to open the same at the end of the power stroke of the piston in the generating cylinder; an exhaust valve arranged in the expansion cylinder; and means for actuating the exhaust valve at the end of the power stroke of the piston in the expansion cylinder.

65. In an engine the combination of a generating cylinder; an expansion cylinder; pistons in said cylinders; devices for injecting combustible fluid into the combustion chamber during the power stroke of its piston; a passage connecting said cylinders; a valve controlling the discharge of gases from the generating chamber to said passage; means for actuating said valve to open the same at the end of the power stroke of the piston in the generating cylinder; an exhaust valve arranged in the expansion cylinder; and means for actuating the exhaust valve at the end of the power stroke of the piston in the expansion cylinder.

66. In an engine the combination of a generating cylinder; an expansion cylinder; pistons in said cylinders; devices for injecting combustible fluid into the combustion chamber during the power stroke of its piston; a passage connecting said cylinders; a valve controlling the discharge of gases from the generating chamber to said passage; means for actuating said valve to open the same at the end of the power stroke of the piston in the generating cylinder; a valve at the entrance of said passage to the expansion cylinder, said valve being arranged to prevent a back flow of gases from the expansion cylinder; an exhaust valve in the expansion cylinder; and means for actuating the exhaust valve at the end of the power stroke of the piston in the expansion cylinder.

67. In an engine the combination of a generating cylinder; a piston therein; apparatus acting with said cylinder and piston for compressing air to a point raising its temperature sufficiently to ignite a combustible fluid; an expansion cylinder; a piston in said cylinder, a passage connecting said cylinders; devices for injecting combustible fluid into the generating chamber timed to inject said fluid with the compressed air at the igniting point; mechanism for injecting a liquid into said chamber during the power stroke said liquid being adapted to be vaporized by the combustible fluid; a valve at the entrance of said passage between said cylinders; said valve controlling the said passage, and being adapted to open at the end of the power stroke in the generating chamber; an exhaust valve in the expansion chamber; and means for actuating said valve at the completion of the power stroke in the expansion chamber.

68. In an engine the combination of two generating cylinders; an expansion cylinder; passages connecting said generating cylinders with said expansion cylinder; valves controlling said passages; and means for actuating said valves alternately.

69. In an engine the combination of two generating cylinders; an expansion cylinder; passages connecting said generating cylinders with said expansion cylinder; valves controlling said passages; means for actuating said valves alternately; an exhaust valve in the expansion cylinder; and means for actuating said exhaust valve with each discharge stroke of the piston of the expansion cylinder.

70. In an engine the combination of two generating cylinders; pistons in said cylinders; means acting with said cylinders for compressing air to create a temperature to ignite a combustible fluid; devices for injecting a combustible fluid into said cylinders with the air at the ignition point; means for injecting a liquid into said chamber, said liquid being adapted to vaporize by the burning mixture therein; controlling devices arranged to effect an alternate action of said generating cylinders; an expansion cylinder; passages between said expansion cylinder and said generating cylinders; valves controlling said passages; and means for actuating said valves alternately, to permit the purging stroke of the generating cylinder to act expansively in the expansion cylinder.

71. In an engine the combination of a generating cylinder; a piston therein; apparatus acting with said cylinder and piston for compressing air to a point raising its temperature sufficiently to ignite a combustible fluid; an expansion cylinder; a piston in said cylinder; passages connecting said cylinders; devices for injecting combustible fluid into the generating chamber timed to inject said fluid with the compressed air at the igniting point; mechanism for injecting a liquid into said chamber during the power stroke, said liquid being adapted to be vaporized by the combustible fluid; a valve at the entrance of said passage between said cylinders; a valve controlling the said passage, said valve being adapted to open at the end of the power stroke in the generating chamber; an exhaust valve in the expansion chamber; means for actuating said valve at the completion of the power stroke in the expansion chamber; and appliances for automatically controlling the injection of fluid to the generating cylinder to automatically control the speed of the engine.

72. In an engine the combination of two generating cylinders; pistons in said cylinders; means acting with said cylinders for compressing air to create a temperature to ignite a combustible fluid; devices for injecting a combustible fluid into said cylinder with the air at the ignition point; means for injecting a liquid into said chamber, said liquid being adapted to vaporize in the burning mixture therein; controlling devices arranged to effect an alternate action of said generating cylinders; an expansion cylinder; passages between said expansion cylinder and said generating cylinders; valves controlling said passages; means for actuating said valves alternately, to permit the purging stroke of the generating cylinder to act expansively in the expansion chamber; and appliances for automatically controlling the injection of fluid to the generating cylinder to automatically control the speed of the engine.

73. In an engine the combination of a generating cylinder; a piston therein; apparatus acting with said cylinder and piston for compressing air to a point raising its temperature sufficiently to ignite a combustible fluid; an expansion cylinder; a piston in said cylinder; passages connecting said cylinders; devices for injecting combustible fluid into the generating chamber timed to inject said fluid with the compressed air at the igniting point; mechanism for injecting a liquid into said chamber during the power stroke, said liquid being adapted to be vaporized by the combustible fluid; a valve at the entrance of said passage between said cylinders; a valve controlling the said passage, said valve being adapted to open at the end of the power stroke in the generating chamber; an exhaust valve in the expansion chamber; means for actuating said valve at the completion of the power stroke in the expansion chamber; appliances for automatically controlling the injection of fluid to the generating cylinder to automatically control the speed of the engine; means for connecting the expansion cylinder directly with a fluid supply under pressure; and a valve mechanism timed to control the admission of this fluid to the power strokes of the piston in the expansion cylinder for starting the engine.

In testimony whereof we have hereunto set our hands in the presence of two subscribing witnesses.

FRITZ SCHNEIDER.
GEORGE B. CONRATH.

Witnesses:
C. D. HIGBY,
FRITZ SCHNEIDER, Jr.